(12) United States Patent
Robb et al.

(10) Patent No.: US 8,541,348 B2
(45) Date of Patent: Sep. 24, 2013

(54) STABILIZATION OF EMULSIONS CONTAINING RESINOUS MATERIAL FOR USE IN THE FIELD OF OIL OR GAS WELL TREATMENTS

(75) Inventors: Ian D. Robb, Lawton, OK (US); Sherry Gale Gaskins, Lawton, OK (US); Jimmy D. Weaver, Duncan, OK (US); Phillip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/433,581

(22) Filed: Mar. 29, 2012

(65) Prior Publication Data

US 2013/0130946 A1 May 23, 2013

Related U.S. Application Data

(62) Division of application No. 12/505,005, filed on Jul. 17, 2009, now Pat. No. 8,404,623.

(51) Int. Cl.
*C09K 8/68* (2006.01)
(52) U.S. Cl.
USPC ........... 507/219; 507/261; 507/263; 507/265; 507/266; 507/267; 166/308.1
(58) Field of Classification Search
None
See application file for complete search history.

(56) References Cited

U.S. PATENT DOCUMENTS

| | | | |
|---|---|---|---|
| 4,000,781 A * | 1/1977 | Knapp | 166/276 |
| 4,352,396 A | 10/1982 | Friedman | |
| 4,997,642 A | 3/1991 | Curtis et al. | |
| 5,674,511 A | 10/1997 | Kacher et al. | |
| 6,838,112 B1 | 1/2005 | Endico | |
| 6,933,415 B2 | 8/2005 | Zhao et al. | |

* cited by examiner

*Primary Examiner* — John J Figueroa
(74) *Attorney, Agent, or Firm* — Robert A. Kent; Booth Albanesi Schroeder LLC

(57) ABSTRACT

Emulsions for use in a well including: (a) a water-insoluble resinous material; (b) water; and (c) an emulsifier, wherein the emulsifier comprises a non-ionic, a cationic, or a zwitterionic emulsifier; wherein the continuous phase of the emulsion comprises the water; wherein a dispersed phase of the emulsion comprises the resinous material; wherein the dispersed phase is in the form of droplets having a size distribution range such that at least 50% of the droplets have a size of 0.5 micrometers-500 micrometers; wherein the resinous material of the droplets is in a concentration of at least 5% by weight of the water; and wherein the composition of the droplets has a viscosity of less than 2,000 Poise measured at 20° F. Methods include the steps of: (a) forming an emulsion described above; and (b) introducing the emulsion into a portion of a subterranean formation.

13 Claims, No Drawings

US 8,541,348 B2

STABILIZATION OF EMULSIONS CONTAINING RESINOUS MATERIAL FOR USE IN THE FIELD OF OIL OR GAS WELL TREATMENTS

CROSS-REFERENCE TO RELATED APPLICATIONS

This is a divisional of U.S. application Ser. No. 12/505,005 filed Jul. 17, 2009.

STATEMENT REGARDING FEDERALLY SPONSORED RESEARCH OR DEVELOPMENT

Not applicable

REFERENCE TO MICROFICHE APPENDIX

Not applicable

SUMMARY OF THE INVENTION

The compositions and methods according to the inventions are directed to the field of treating subterranean formations for the purpose of producing oil or gas.

According to one aspect of the inventions emulsion compositions are provided. Emulsions according to this aspect include: (a) a water-insoluble resinous material; (b) water; and (c) an emulsifier, wherein the emulsifier comprises a non-ionic, a cationic, or a zwitterionic emulsifier; wherein the continuous phase of the emulsion comprises the water; wherein a dispersed phase of the emulsion comprises the resinous material; wherein the dispersed phase is in the form of droplets having a size distribution range such that at least 50% of the droplets have a size of 0.5 micrometers-500 micrometers; wherein the resinous material of the droplets is in a concentration of at least 5% by weight of the water; and wherein the composition of the droplets has a viscosity of less than 2,000 Poise at 20° F.

DETAILED DESCRIPTION OF THE INVENTION

Oil and gas hydrocarbons are naturally occurring in some subterranean formations. Subterranean formations that contain oil or gas are called reservoirs. The reservoirs may be located under land or offshore.

In order to produce oil or gas, a well is drilled into a subterranean formation, which may be a reservoir or adjacent to a reservoir. As used herein, a well includes at least one wellbore drilled into the earth. As used herein, the term "wellbore" refers to the wellbore itself, including a cased portion of the well and any openhole or uncased portion of the well.

Various types of treatments are commonly performed on a well or subterranean formation. For example, stimulation is a type of treatment performed on a well or subterranean formation to restore or enhance the productivity of oil and gas from the well or subterranean formation. Stimulation treatments fall into two main groups; hydraulic fracturing and matrix treatments. Fracturing treatments are performed above the fracture pressure of the subterranean formation to create or extend a highly-permeable flow path between the formation and the wellbore. Other types of treatments include, for example, controlling excessive water production and sand control.

A well or subterranean formation is normally treated with a treatment fluid. As used herein, a "treatment fluid" is a fluid used to resolve a specific condition of a wellbore or subterranean formation. As used herein, a "treatment fluid" also means the specific composition of a fluid at the time the fluid is being introduced into a wellbore. A treatment fluid is typically adapted to be used to resolve a specific purpose, such as stimulation, isolation, or control of reservoir gas or water. The word "treatment" in the term "treatment fluid" does not necessarily imply any particular action by the fluid. As used herein, a "fluid" is a continuous amorphous substance that tends to flow and to conform to the outline of its container as a liquid or a gas when tested at a temperature of 77° F. and a pressure of one atmosphere. In addition, as used herein, a "fluid" should be pumpable when the fluid is introduced into the subterranean formation. As used herein, a "fluid" can be a slurry, which is a suspension of insoluble particles. In addition, as used herein, a "fluid" can be an emulsion. A treatment fluid can include a gas for foaming the fluid.

"Hydraulic fracturing," sometimes simply referred to as "fracturing," is a common stimulation treatment. A treatment fluid adapted for this purpose is sometimes referred to as a "fracturing fluid." The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

A "frac pump" is used for hydraulic fracturing. A frac pump is a high-pressure, high-volume pump. Typically, a frac pump is a positive-displacement reciprocating pump. The structure of such a pump is resistant to the effects of pumping abrasive fluids, and the pump is constructed of materials that are resistant to the effects of pumping corrosive fluids. Abrasive fluids include hard, insoluble particulates, such as sand, and corrosive fluids include, for example, acids. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are common.

To fracture a subterranean formation typically requires hundreds of thousands of gallons of fracturing fluid. Further, it is often desirable to fracture at more than one downhole location of a well. Thus, a high volume of fracturing fluid is usually required to treat a well, which means that a low-cost fracturing fluid is desirable. Because of the ready availability and relative low cost of water compared to other liquids, a fracturing fluid is usually water-based. As used herein, "water-based" means that a fluid comprises greater than 50% by weight of an aqueous solution.

The formation or extension of a fracture occurs suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation is indicated by a sudden drop in fluid pressure, which can be observed at the wellhead.

A newly-created or extended fracture will tend to close together after the pumping of the fracturing fluid is stopped. To prevent the fracture from closing, a material must be placed in the fracture to keep the fracture propped open. A material used for this purpose is referred to as a "proppant."

The proppant is in the form of a solid particulate, which can be suspended in the fracturing fluid, carried downhole, and deposited in the fracture as a "proppant pack." The proppant pack props the fracture in an open condition while allowing fluid flow through the permeability of the pack. A particulate for use as a proppant is selected based on the characteristics of size range, crush strength, and insolubility.

The proppant is an appropriate size to prop open the fracture and allow fluid to flow through the proppant pack, that is, in between and around the proppant making up the pack. Appropriate sizes of particulate for use as a proppant are typically in the range from about 8 to about 100 U.S. Standard Mesh. A typical proppant is sand sized, which geologically is defined as having a largest dimension ranging from 0.0625 millimeters up to 2 millimeters (mm). (The next smaller particle size class below sand sized is silt, which is defined as having a largest dimension ranging from less than 0.0625 mm down to 0.004 mm.) The next larger particle size class above sand sized is gravel, which is defined as having a largest dimension ranging from greater than 2 mm up to 64 mm. In a preferred embodiment of the invention, the proppant has a particulate size distribution range such that at least 90% of the proppant has a size of 0.0625 mm to 0.6 mm.

The proppant is sufficiently strong, that is, has a sufficient compressive or crush resistance, to prop the fracture open without being deformed or crushed by the closure stress of the fracture in the subterranean formation. For a proppant material that crushes under closure stress, the proppant preferably has an API crush strength of at least 4,000 psi closure stress based on 10% crush fines. This performance is that of a medium crush-strength proppant, whereas a very high crush-strength proppant would be 10,000 psi.

Further, a suitable proppant should not dissolve in fluids commonly encountered in a well environment. Preferably, a material is selected that will not dissolve in water or crude oil.

Suitable proppant materials include, but are not limited to, sand, ground nut shells or fruit pits, sintered bauxite, glass, plastics, ceramic materials, processed wood, resin coated sand or ground nut shells or fruit pits or other composites and any combination thereof in any proportion.

The proppant pack in the fracture provides a higher-permeability flow path for the oil or gas to reach the wellbore compared to the permeability of the surrounding subterranean formation. This flow path increases oil and gas production from the subterranean formation.

The concentration of proppant in the treatment fluid is preferably in the range of from about 0.03 kilograms to about 3 kilograms of proppant per liter of liquid phase (0.25 lb/gal-25 lb/gal).

The proppant typically has a much different density than water. For example, water has a specific gravity of 1.0 and sand has a specific gravity of about 2.7. A different-density proppant contained in water will tend to separate quickly from the water very rapidly. Increasing the viscosity of the water using a viscosity-increasing agent can help prevent the proppant from quickly separating out of the fluid. A viscosity-increasing agent is sometimes known in the art as a "thickener."

Viscosity is the resistance of a fluid to flow, defined as the ratio of shear stress to shear rate. The viscosity of a well treatment fluid is usually expressed in units of centipoise ("cP"). Viscosity must have a stated or an understood shear rate and measurement temperature in order to be meaningful. As used herein, if not otherwise specifically stated, the viscosity of a fluid is measured with a Fann Model 50 type viscometer at a shear rate of 40 l/s and at temperature simulating bottomhole temperature of the well.

There are numerous ways of measuring and modeling viscous properties, and new developments continue to be made. A typical method for QA/QC purposes uses a couette device that measures viscosity as a function of time and temperature. Due to the geometry of most common viscosity-measuring devices, proppant interferes with the measurement. Therefore, the viscosity of a fracturing fluid is usually inferred by measuring the viscosity of a test fluid that is similar to the fracturing fluid without any proppant included. If measured with a Proppant Transport Measuring Device (PTMD) (see SPE 115298), which allows the measurement of the viscosity of a fluid containing a proppant, the instrument is preferably calibrated, for example, against a Fann Model 50 viscometer. The viscosity-measuring instrument can be calibrated using standard viscosity silicone oils and fluids.

For reference, the viscosity of water is about 1 cP. As used herein, a fluid is considered to be pumpable if it has a viscosity of less than 5,000 cP.

Some viscosity-increasing agents can also help suspend the proppant by increasing the elastic modulus of the fracturing fluid. An example of a viscosity-increasing agent that also increases the elastic modulus of a fluid is a viscoelastic surfactant. An elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero.

Because of the high volume of fracturing fluid typically used in a fracturing operation, it is desirable to efficiently increase the viscosity of fracturing fluids to the desired viscosity using as little viscosity-increasing agent as possible. Being able to use only a small concentration of the viscosity-increasing agent requires a lesser amount of the viscosity-increasing agent in order to achieve the desired fluid viscosity in a large volume of fracturing fluid. Efficient and inexpensive viscosity-increasing agents include water-soluble polymers such as guar gum.

The viscosity of a fluid at a given concentration of viscosity-increasing agent can be greatly increased by cross-linking the viscosity-increasing agent. A cross-linking agent can be used for this purpose. One example of a cross-linking agent is a borate. A "base gel" is a fluid that includes a viscosity-increasing agent, such as guar, but that excludes cross-linking agents or cross-linkers.

Optionally, one or more other additives can be included to form a treatment fluid. For example, treatment fluids used in the invention also commonly include a "breaker." A breaker is a chemical used for the purpose of diminishing or "breaking" the viscosity of a fluid so that the fluid can be recovered more easily from the formation. Breakers reduce the molecular weight of the viscosity-increasing agent (which may include a cross-linked viscosity-increasing agent) by the action of an acid, an oxidizer, an enzyme, or a combination of these. The acids, oxidizers, or enzymes can be in the form of delayed-release or encapsulated breakers.

In the case of a cross-linked viscosity-increasing agent, one way to diminish the viscosity is by breaking the cross-links. For example, the borate cross-links in a borate-crosslinked gel can be broken by lowering the pH of the fluid. At a pH above 8, the borate ion exists and is available to cross-link and cause gelling. At a lower pH, the borate is tied up by hydrogen and is not available for cross-linking, thus, an increase in viscosity due to borate cross-linking is reversible.

Treatment fluids used in the invention can further contain other additives that are known to be commonly used in oil field applications by those skilled in the art. These include, but are not necessarily limited to, breaker aids, co-surfactants, oxygen scavengers, alcohols, scale inhibitors, corrosion inhibitors, fluid-loss additives, oxidizers, bactericides, biocides, and the like.

It should be understood that, during the course of a treatment for a particular objective, such as stimulation, the compositions of the treatment fluids can be varied or several different types of treatment fluids can be used. For example, the compositions can be varied to adjust viscosity or elasticity of the fluids to accommodate changes in the concentrations of proppant desired to be carried down to the subterranean formation from initial packing of the fracture to tail-end packing. It can also be desirable to accommodate expected changes in temperatures encountered by the fluids during the course of the treatment. By way of another example, it can be desirable to accommodate the longer duration that the first treatment fluid may need to maintain viscosity before breaking compared to the shorter duration that a later-introduced treatment fluid may need to maintain viscosity before breaking. One way to change break time, for example, is by changing a particular catalyst. Changes in concentration of the proppant, viscosity-increasing agent, or other additives in the various treatment fluids of a treatment operation can be made in stepped changes of concentrations or ramped changes of concentrations.

Several problems can be encountered in the effort to produce oil or gas from a subterranean formation. One common problem is that the proppant may not be sufficiently strong by itself to prop open a fracture. Another common problem is that the surface of the proppant may have an undesirable wettability characteristic for producing oil or gas from a particular subterranean formation. Another common problem is that, as the oil or gas moves through the subterranean formation, it can dislodge and carry particulate with the fluid into the wellbore. The migration of this particulate can plug pores in the formation or proppant pack, decreasing production, in addition to causing abrasive damage to wellbore pumps, tubing, and other equipment.

A resinous material can be used to help alleviate some of the common problems mentioned above. As used herein, the term "resinous material" means a material that is a viscous liquid and has a sticky or tacky characteristic when tested at 77° F. A resinous material can include, for example, a resin or a tackifying agent.

For example, some or all of the proppant can be coated with a curable resin. The curable resin can be allowed to cure on the proppant prior to the proppant being introduced into the well. The cured resin coating on the proppant provides a protective shell encapsulating the proppant and keeping the fine particulates in place if the proppant was crushed or provides a different wettable surface than the proppant without the coating.

A curable resin coating on the proppant can be allowed to cure after the proppant is placed in the subterranean formation for the purpose of consolidating the proppant of a proppant pack to form a "proppant matrix." As used herein, "proppant matrix" means a closely associated group of proppant particles as a coherent mass of proppant. Typically, a cured resin consolidates the proppant pack into a hardened, permeable, coherent mass. After curing, the resin reinforces the strength of the proppant pack and reduces the flow back of proppant from the proppant pack relative to a similar proppant pack without such a cured resin coating. Suitable curable resins include, but are not limited to, epoxies, furans, phenolics, and furfuryl alcohols.

By way of another example, some or all of the proppant can be coated with a tackifying agent, instead of, or in addition to, a curable resin. The tackifying agent acts to consolidate and help hold together the proppant of a proppant pack to form a proppant matrix. Such a proppant matrix can be flexible rather than hard. The tackifying-agent-coated proppant in the subterranean formation tends to cause small particulates, such as fines, to stick to the outside of the proppant. This helps prevent the fines from flowing with a fluid, which could potentially clog the openings to pores.

It is also possible treat a proppant pack with an overflush of a curable resin or a tackifying agent to coat the proppant in the subterranean formation. If a curable resin is used in the overflush treatment, the resin is allowed to cure after coating the proppant pack. Similarly, a curable resin or tackifying agent can be introduced into a subterranean formation to help consolidate particulate naturally occurring in a poorly or a loosely consolidated formation. Treatments for controlling proppant or sand migration are sometimes referred to as sand control, and treatments for controlling the migration of fines are sometimes referred to as fines control.

Because of its viscous and sticky characteristics, resinous material is difficult to handle, for example, it is difficult to store, deliver to a well site, and introduce into the wellbore.

According to one aspect of the inventions, emulsion compositions are provided. Emulsions according to this aspect include: (a) a water-insoluble resinous material; (b) water; and (c) an emulsifier, wherein the emulsifier comprises a non-ionic, a cationic, or a zwitterionic emulsifier; wherein the continuous phase of the emulsion comprises the water; wherein a dispersed phase of the emulsion comprises the resinous material; wherein the dispersed phase is in the form of droplets having a size distribution range such that at least 50% of the droplets have a size of 0.5 micrometers-500 micrometers; wherein the resinous material of the droplets is in a concentration of at least 5% by weight of the water; and wherein the composition of the droplets has a viscosity of less than 2,000 Poise at 20° F.

According to another aspect of the inventions, methods are provided for treating a portion of a subterranean formation. Methods according to this aspect include the steps of: (a) forming an emulsion according to the composition described above; and (b) introducing the emulsion into a portion of a subterranean formation.

As used herein, the words "comprise," "has," and "include" and all grammatical variations thereof are each intended to have an open, non-limiting meaning that does not exclude additional elements or steps.

As used herein, the phrases "by weight of the water" means the weight of the water of the continuous phase without the weight of any proppant, viscosity-increasing agent, dissolved salt, or other additives that may be present in the water.

As used herein, an "emulsion" includes at least two liquids that are not soluble with each other, wherein one of the liquids is a continuous phase of the emulsion and another is a dispersed phase of the emulsion. A dispersed phase is in the form of discrete droplets in the emulsion. Preferably, the droplets of a dispersed phase are dispersed uniformly throughout the continuous phase.

According to the inventions, stable emulsion compositions are provided that will not cream, flocculate, or coalesce under certain conditions. As used herein, the term "cream" means at least some of the droplets of a dispersed phase converge towards the surface or bottom of the emulsion (depending on the relative densities of the liquids making up the continuous and dispersed phases). The converged droplets maintain a discrete droplet form. As used herein, the term "flocculate" means at least some of the droplets of a dispersed phase combine to form small aggregates in the emulsion. As used herein, the term "coalesce" means at least some of the droplets of a dispersed phase combine to form larger drops in the emulsion.

According to the present inventions, the droplets of a dispersed phase include the resinous material. As used herein, an emulsion has only one continuous phase but can have more than one dispersed phase. As used herein, all references to "the dispersed phase" are to the dispersed phase that includes the resinous material regardless of the presence of any other dispersed phase. As used herein, all references to the stability of the emulsion are with regard to the dispersed phase that includes the resinous material regardless of the presence of any other dispersed phase or the stability of the emulsion regarding any other dispersed phase that might be present.

Preferably, an emulsion composition according to the invention is stable for storing, including under freeze-thaw conditions, for introducing into high-temperature environments, to the addition of salts to give a high-ionic strength to the emulsion, or to mixing the emulsion with solutions of high-ionic strength. Most preferably, an emulsion according to the invention has all of these advantages. As used herein, the term "freeze-thaw conditions" means from 77° F. to 0° F. and back to 77° F.

Preferably, if the continuous phase has a freezing point lower than 32° F., the composition of the droplets of the dispersed phase that includes the resinous material has a viscosity of less than 2,000 Poise when tested at 20° F. More preferably, the composition of the droplets of the dispersed phase that includes the resinous material has a viscosity less than 1,200 Poise when tested at 20° F. The viscosity of the composition of the droplets is to be tested in bulk form of the composition separated from the emulsion. As used herein, the viscosity of a composition is tested as follows: The resinous phase was placed in an 8 oz jar, diameter 1½" and filled to a depth of 3" and cooled in a deep freeze refrigerator for 10 hours. The sample is then removed from the refrigerator and placed in a Brookfield DV2 rheometer fitted with an LV 4 spindle. The spindle was immersed 1.4 inches into the resinous phase and when the temperature of the resinous phase reached 20° F. the rheometer was operated at 20 rpm. The viscosity in Poise was read from the rheometer.

The emulsion includes a water-insoluble resinous material.

The resinous material preferably has certain solubility characteristics. As used herein, a material is considered to be "soluble" in another liquid if at least 10 grants of the material can be dissolved in one liter of the liquid when tested at 77° F. and 1 atmosphere pressure, and "insoluble" if less than that. Preferably, the resinous material is soluble or miscible in a relatively-polar oil or in a relatively-polar organic solvent. As used herein, the term "relatively polar" means having a dielectric constant >~2 and <~30.

Preferably, the resinous material has a molecular weight of less than 5,000 g/mole.

The resinous material can include a resin, a tackifying agent, and any combination thereof in any proportion. The resin can include a curable resin. Preferably, the resinous material includes a tackifying agent.

The resin or curable resin can be selected from natural resins, synthetic resins, and any combination thereof in any proportion. Suitable natural resins include, but are not limited to, shellac. Suitable synthetic resins include, but are not limited to, epoxies, furans, and any combination thereof in any proportion. Suitable tackifying agents include, but are not limited to, polyamides, polyesters, polyethers and polycarbamates, polycarbonates, and any combination thereof in any proportion. It is preferred that the resinous material is not a vinyl-based polymer.

Preferably, the resinous material of the droplets is in a concentration in the range of 10% to about 40% by weight of the water. More preferably, the resinous material of the droplets is in a concentration in the range of 15% to about 60% by weight of the water.

The resinous material dispersed in the treatment fluid can be the same or different from a resin or tackifying agent coated on a proppant in the treatment fluid. For example, if the proppant is coated with a pre-cured curable resin, the emulsion can have a dispersed phase with a different resinous material, such as a tackifying agent.

The emulsion can also includes a diluent for the resinous material. It is preferable that the diluent be capable of dissolving at least 25 grams of the resinous material per 0.1 liter of diluent. More preferably, the diluent and the resinous material are miscible. If the continuous phase has a freezing point lower than 32° F., it is preferable that the diluent has a freezing point lower than the freezing point of the continuous phase.

The diluent can be a relatively-polar organic fluid. The relatively-polar organic fluid can be selected from the group consisting of dipropylene glycol, long-chain alcohols, xylenes, and any combination thereof in any proportion. The relatively-polar oil can be selected from the group consisting of vegetable oil, fatty acids, fatty alcohols, derivatives of any of the foregoing, and any combination of any of the foregoing in any proportion. As used herein, a "derivative" is a chemical modification that does not change the essential characteristic or chemical functionality of the vegetable oil, fatty acid, or fatty alcohol. Preferably, the vegetable oil is selected from the group consisting of corn oil, cotton seed oil, and any combination thereof in any proportion.

An oil-soluble surfactant can be included in the emulsion to facilitate mixing between the diluent and the resinous material.

Preferably, the droplets of the resinous material further include the diluent. More preferably, the ratio of the diluent to the resinous material in the droplets is in the range of 1:10 to 10:1 by weight.

The emulsion includes water. It is expected that the water will be in the continuous phase. The water for use in the emulsion can be obtained from the group consisting of freshwater, brackish water, seawater, brine, and any combination thereof in any proportion. Preferably, the water is obtained from freshwater. Preferably, the water is present in at least 30% by weight of the emulsion. More preferably, the water is present in the range of 30% to 70% by weight of the emulsion.

The emulsion optionally includes a suspending agent. As used herein, a "suspending agent" means an agent that helps prevent the droplets of the dispersed phase from creaming in the emulsion. More particularly, the suspending agent, when tested at a concentration of 0.5% by weight in water, provides a fluid having an elastic modulus of greater than 1 Pa as measured within the linear viscoelastic region. More preferably, the suspending agent, when tested at a concentration of 0.5% by weight in water, provides a fluid having an elastic modulus of greater than 3 Pa as measured within the linear viscoelastic region. The suspending agent can be capable of gelling.

The suspending agent can include a polymer. The polymer can be selected from the group consisting of, polyacrylamide or polysaccharides such as guar, xanthan, diutan, scleroglucan, and any combination thereof in any proportion. The polymer of the suspending agent is preferably capable of cross-linking or being cross-linked. The suspending agent can also include a cross-linking agent for the polymer.

Preferably, the suspending agent is present in the emulsion in a concentration at least sufficient to suspend the dispersed phase in the continuous phase. Preferably, the suspending agent is present in a concentration of at least 0.1% by weight of the water.

The emulsion includes an emulsifier. As used herein, an "emulsifier" means that it helps prevent the droplets of the dispersed phase from flocculating or coalescing in the emulsion.

The emulsifier can include a cationic, a zwitterionic, or a nonionic emulsifier. Preferably, the emulsifier includes a surfactant. The surfactant can be selected from the group consisting of ethoxylated fatty molecules, betaines, glucosides, ethyleneoxide-propylene oxide copolymers, quaternized ethoxylated fatty materials or ethoxylated amines, and any combination thereof in any proportion. Ethoxylated surfactants preferably have a normal distribution of ethylene oxide groups in the range of 10 monomer units-200 monomer units. More preferably, the length of the ethylene oxide portion of the nonionic surfactant has a normal distribution in the range of 20 monomer units-50 monomer units. The emulsion may also contain a co-emulsifier such as poly(vinyl alcohol) or pluronic or tetronic surfactant that may be used in conjunction with the surfactants mentioned above.

The emulsifier is preferably in a concentration of at least 1% by weight of the water of the emulsion. More preferably, the emulsifier is in a concentration in the range of 1%-10% by weight of the water.

The emulsion includes a continuous phase comprising water. The continuous phase is preferably liquid at 77° F. The continuous phase can be a gel.

The emulsion includes a dispersed phase that includes the resinous material It is preferable for the composition of the dispersed phase to be pourable. Preferably, the dispersed phase includes the resinous material in the form of droplets having a size distribution range such that at least 50% of the droplets have a size of 1 micrometers-200 micrometers. Preferably, the dispersed phase comprises 30%-70% by volume of the emulsion.

The emulsion can also include other additives. For example, the emulsion can contain a freezing-point depressant. More preferably, the freezing point depressant is for the water of the continuous phase. Preferably, the freezing-point depressant is selected from the group consisting of water soluble ionic salts, alcohols, glycols, urea, and any combination thereof in any proportion.

The emulsion can also contain water-soluble salt(s) at a high-ionic strength for other purposes, for example, to increase the density of the continuous phase of the emulsion. Preferably, the water-soluble salt is selected from the group consisting of: an alkali metal halide, alkaline earth halide, alkali metal formate, and any combination thereof in any combination.

It is an advantage of the present inventions to provide an emulsion that is stable under one or more of certain conditions commonly encountered in the storage and use of such an emulsion composition for a well treatment operation. Preferably, the dispersed phase that includes the resinous material does not cream, flocculate, or coalesce when stored at a temperature of 0° F. for 10 days and then warmed to 77° F. Preferably, the dispersed phase that includes the resinous material does not cream, flocculate, or coalesce when tested under a freeze-thaw cycle from 77° F. to 0° F. and back to 77° F. Preferably, the dispersed phase that includes the resinous material does not cream, flocculate, or coalesce when tested at a temperature of 230° F. for 3 days and then cooled to 77° F. More preferably, the dispersed phase that includes the resinous material does not cream, flocculate, or coalesce when tested at any temperature in the range of 230° F.-250° F. for 2 days and then cooled to 77° F. Preferably, dispersed phase that includes the resinous material does not cream, flocculate, or coalesce when the emulsion contains 1%-5% by weight of KCl. Preferably, the dispersed phase that includes the resinous material of an emulsion according to the invention that contains 3% by weight KCl does not cream, flocculate, or coalesce when cooled from a temperature of 77° F. to a temperature of 0° F. and then returned to 77° F. It should be understood that the dispersion is visually examined for creaming, flocculating, or coalescing.

According to another aspect of the inventions, methods are provided for treating a portion of a subterranean formation. Methods according to this aspect include the steps of: (a) forming an emulsion, the emulsion comprising: (i) a water-insoluble resinous material; (ii) water; and (iii) an emulsifier, wherein the emulsifier comprises a non-ionic, cationic, or a zwitterionic emulsifier; wherein the continuous phase of the emulsion comprises the water; wherein a dispersed phase of the emulsion comprises the resinous material; wherein the dispersed phase is in the form of droplets having a size distribution range such that at least 50% of the droplets have a size of 0.5 micrometers-500 micrometers; wherein the resinous material of the droplets is in a concentration of at least 5% by weight of the water; and wherein the composition of the droplets has a deformability of at least 0.1 μm when tested at 32° F.; and (b) introducing the emulsion into a portion of a subterranean formation.

According to this aspect, the emulsion used in the method optionally includes a suspending agent.

Preferably, the emulsion further includes a diluent for the resinous material. If the emulsion includes a diluent for the resinous material, then preferably the step of forming the emulsion further includes the steps of: (a) blending the resinous material and the diluent to form a diluted resinous material; and (b) blending the diluted resinous material with the water to form the emulsion.

The method can include the step of storing the emulsion for at least 7 days within a temperature range of 25° F.-75° F. between the step of forming and the step of introducing. The method can include the step of storing the emulsion under conditions such that the emulsion undergoes at least one freeze-thaw cycle between the step of forming and the step of introducing.

The emulsion can include water-soluble salt(s) at a high-ionic strength. The method can also include the step of adding the emulsion to an aqueous solution of a high-ionic strength prior to or during the step of introducing.

The emulsion can include a proppant. The method preferably includes the step of mixing the emulsion with another fluid comprising the proppant to form a treatment fluid prior to or during the step of introducing. Preferably, the proppant is in a particulate size distribution range such that at least 90% of the proppant has a size of 0.0625 mm-0.6 mm.

In a presently preferred embodiment of an emulsion according to the inventions, the emulsion comprises 25% v/v corn oil, 50% v/v water including 0.2% diutan by weight of the water, 2% castor oil $EO_{200}$ by weight of the water, 5% NaCl by weight of the water, and 25% resinous material by weight of the water. A small concentration of an oil-soluble surfactant is included to help mix the resinous material with the corn oil mix.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. An emulsion comprising:
    (a) a water-insoluble resinous material;
    (b) water;
    (c) an emulsifier, wherein the emulsifier comprises a non-ionic emulsifier; and
    (d) a suspending agent, wherein the suspending agent, when tested at a concentration of 0.5% by weight in water, provides a fluid having an elastic modulus of greater than 1 Pa as measured within the linear viscoelastic region;
    wherein the continuous phase of the emulsion comprises the water;
    wherein a dispersed phase of the emulsion comprises the resinous material;
    wherein the dispersed phase is in the form of droplets having a size distribution range such that at least 50% of the droplets have a size of 0.5 micrometers —500 micrometers;
    wherein the resinous material of the droplets is in a concentration of at least 5% by weight of the water; and
    wherein the composition of the droplets has a viscosity of less than 2,000 Poise at 20° F.

2. The emulsion according to claim 1, wherein the suspending agent, when tested at a concentration of 0.5% by weight in water, provides a fluid having an elastic modulus of greater than 3 Pa as measured within the linear viscoelastic region.

3. The emulsion according to claim 1, wherein the resinous material is soluble or miscible in a relatively-polar organic solvent or relatively-polar oil.

4. The emulsion according to claim 1, wherein the resinous material has a molecular weight of less than 5,000 g/mole.

5. The emulsion according to claim 1, wherein the resinous material is a tackifying agent.

6. The emulsion according to claim 1, further comprising a diluent for the resinous material.

7. The emulsion according to claim 6, wherein the diluent is selected from the group consisting of vegetable oil, fatty acids, fatty alcohols, derivatives of any of the foregoing, and any combination thereof in any proportion.

8. The emulsion according to claim 1, wherein the emulsifier comprises a surfactant.

9. The emulsion according to claim 1, wherein the emulsion does not cream, flocculate, or coalesce when tested at a temperature of 0° F. for 10 days.

10. The emulsion according to claim 1, wherein the emulsion does not cream, flocculate, or coalesce when tested under a freeze-thaw cycle from 77° F. to 0° F. and back to 77° F.

11. The emulsion according to claim 1, wherein the emulsion does not cream, flocculate, or coalesce when tested at a temperature of 230° F. for 3 days and then returned to 77° F.

12. The emulsion according to claim 1, wherein the emulsion containing a 3% by weight KCl does not cream, flocculate, or coalesce when cooled from a temperature of 77° F. to a temperature of 0° F. and then returned to 77° F.

13. The emulsion according to claim 1, wherein the emulsion further comprises salt at high-ionic strength.

* * * * *